Dec. 18, 1951 A. J. RACK 2,579,336

STABILIZED TRANSISTOR TRIGGER CIRCUIT

Filed Sept. 15, 1950

INVENTOR
A. J. RACK
BY Harry C. Hart
ATTORNEY

Patented Dec. 18, 1951

2,579,336

UNITED STATES PATENT OFFICE 2,579,336

STABILIZED TRANSISTOR TRIGGER CIRCUIT

Alois J. Rack, Millington, N. J., assignor to Bell Telephone Laboratories, Incorporated, New York, N. Y., a corporation of New York Application September 15, 1950, Serial No. 185,041

7 Claims. (Cl. 171—97)

This invention relates to transistor trigger circuits and has for its general object the achievement of performance and operation of such circuits which shall be uniform, reliable, and rapid under all conditions to be met with in practice.

A particular object of the invention is to render such a circuit independent of the temperature and of peculiarities of the individual transistor which serves as its active element. A related object is to improve the response of such a trigger circuit to the pulses which operate to trip it.

Transistor trigger circuits may be of several varieties. One group of such circuits employs as its central element a current-multiplication transistor as described, for example, in an article by R. M. Ryder and R. J. Kircher published in the Bell System Technical Journal for July, 1949, at page 367 (vol. 28). Of this group, a circuit to which the present invention is especially applicable comprises a current-multiplication transistor to which there is connected an external network including a source of operating potential for the collector, a feedback-promoting resistor in series with the base, and a "load line" resistor connected to the emitter. The current-voltage characteristic of the transistor and its base resistor, taken together, has a central negative resistance part bounded on either side by positive resistance parts, with which the negative resistance part is continuous. The system is monostable, astable, or bistable, depending on whether the load line, i. e., the characteristic of the resistor externally connected to the emitter, intersects the transistor characteristic in one of its positive resistance parts, in its negative resistance part, or in all three. For single trip (monostable) or multivibrator (astable) action, a condenser is preferably connected in the emitter circuit. Such a system is described in "A Transistor Trigger Circuit," by H. J. Reich and R. L. Ungvary, published in the Review of Scientific Instruments for August, 1949, at page 586 (vol. 20). The system, as well as others, is described in an application of A. J. Rack, Serial No. 79,861, filed March 5, 1949.

Operating experience with such a circuit has revealed that its behavior with one transistor at a given temperature may differ widely from its behavior with the same transistor at a different temperature or with another transistor at the same temperature in two important respects. First, with given circuit element values, the circuit may be monostable with one transistor, bistable with a second and astable with a third. Furthermore, in the monostable case or the bistable case, a large external pulse may be required to trip it in with one transistor while a much smaller pulse serves to trip it with another. Similar variations appear with temperature in a single transistor. Both of these effects have been traced to the fact that transistors differ widely from one another in the magnitudes of the base currents which they draw when their emitters are biased into the nonconducting condition, and this base current, flowing through the comparatively large external base resistance which is required to produce the negative resistance characteristic results in the fact that the tripping point of the negative resistance characteristic of the circuit as a whole differs considerably, and for the same external circuit elements, from one transistor to another, or for a single transistor with temperature.

On the other hand, the current-voltage characteristic of a transistor alone, i. e., one to which no external base resistance is connected, is definite; i. e., very closely the same for one transistor as it is for another. Furthermore this current-voltage characteristic can, by proper selection of the transistor collector voltage or current, be caused to pass almost exactly through the origin of coordinates at which both the emitter current and the emitter voltage are at zero.

The present invention overcomes the foregoing defects by turning the characteristic of the transistor alone to account, without sacrifice of the benefits of the characteristic of the transistor to whose base electrode a large external resistor is connected. This is accomplished by the inclusion, in series with the base electrode, of a current-controlled element whose resistance changes from a low value to a high value as the desired tripping current is passed in one direction and changes back again when the current is reduced below this value. Its action is to switch the circuit as a whole from a stable condition to an unstable one. In the first condition, the resistance connected in series with the base is very low, the circuit is stable, its input resistance is always positive, and its characteristic passes almost exactly through the point representing the condition of zero emitter current and zero emitter voltage. However, for any positive value of emitter current, base current commences to flow and the new element turns to its high resistance condition, in which case a high resistance is connected in series with the base electrode of the transistor, positive or regenerative feedback takes place, and the input impedance as seen at the emitter terminal of the transistor has a negative part.

Essentially, the new element is a current-controlled switch. A preferred form comprises a rectifier, e. g., a point-contact rectifier so poled that its direction of forward conduction or easy flow is opposite to that of the normal flow of transistor base current. Another form comprises a thermistor having a large positive temperature coefficient.

The circuit can be operated and can serve as a trigger circuit in any desired connection, for example a multivibrator, a flip-flop circuit or a single trip multivibrator, as desired.

The invention will be fully apprehended from the following detailed description of preferred embodiments thereof, taken in connection with the appended drawing, in which.

Figure 1:
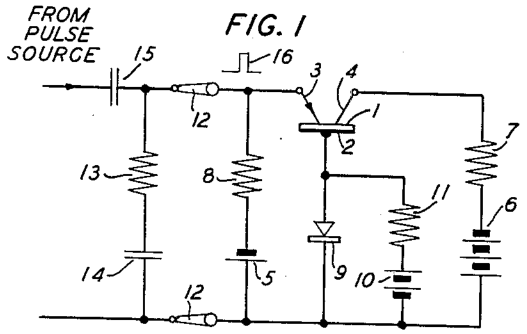
Fig. 1 is a schematic circuit diagram showing a transistor trigger circuit embodying the invention.

Referring now to the drawings, Fig. 1 shows a current-multiplication transistor having a semiconductive body 1 with which a base electrode 2 makes ohmic contact, while an emitter electrode 3 and a collector electrode 4 preferably make rectifier contact with the surface of the body. The emitter electrode is biased in the reverse direction as by a small battery 5 while the collector is biased as by a larger battery 6 for conduction in the reverse direction. A resistor 7 which may serve as an output load, or may be included merely to protect the collector contact from damage, is connected in the collector circuit, while a "load line" resistor 8 is connected to the emitter electrode 3. A feedback-promoting resistance element is connected in series with the base electrode. This element is a rectifier 9 for example of the point-contact variety, and is poled so that its direction of easy current flow is opposite to the direction of normal flow of the transistor base electrode current. Thus, in the case of a transistor of which the semiconducting body is of N-type material, the direction of normal current flow in the base-collector circuit is into the base and out of the collector, so that the rectifier is poled for easy current flow out of the base electrode as shown. With a transistor whose semiconductive body is constructed of P-type material, the polarity of the rectifier is to be reversed. The rectifier may be fed with a bias current, separate and distinct from the collector bias current, from a source such as a battery 10 and by way of a current-controlling resistor 11.

The circuit as so far described embodies the present invention and operates in accordance with its principles. It may be employed in any desired connection. For example, with a "load line" resistor 8 of magnitude such that the intersection of its characteristic is on the negative resistance part of the characteristic of the circuit, a multivibrator results. In addition, there is shown connectable by way of switches 12 to the input terminals of the circuit above described, an input circuit comprising a resistor 13 in series with a condenser 14, the pair being connected in shunt with the novel circuit. A blocking condenser 15 may be added to prevent the application of improper steady voltages to the emitter electrode 3. With this addition, the circuit may operate as a single trip multivibrator being tripped, for example, by the application of a positive pulse 16 to its emitter electrode.

Disregarding for the present the [illegible] character of rectifier 9 and its bias [illegible] (i. e., assuming for the present tha[illegible] impedance in series with the base [illegible] of the transistor is a high ohmic r[illegible] is circuit, except for the magnitud[illegible]d line resistor 8, is substantially as d[illegible] A. J. Rack patent application an[illegible] Ungvary publication above referre[illegible] is known that its emitter current-e[illegible]ge characteristic has the approximate [illegible] the letter N as indicated by any one o[illegible]c-teristic curves of Fig. 2, in which a[illegible]te negative resistance part is bounde[illegible] by a positive resistance part. It [illegible] that the left-hand or upper reflex [illegible] the left-hand branch of each such [illegible]es from positive resistance to negative [illegible]p and lies very close to the zero cur[illegible], the current at the peak is about [illegible]ro-amperes; that the lower reflex poi[illegible]ve where the negative resistance pa[illegible]o the right-hand positive resistance b[illegible]n less sharp; and that the left-han[illegible] sistance branch of the curve is muc[illegible] the right-hand branch.

Figure 2:
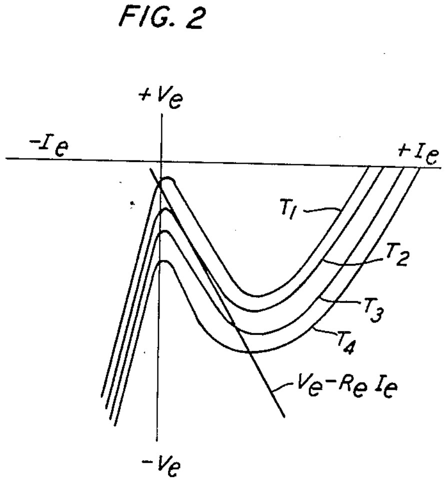
Fig. 2 shows a set of current-voltage characteristics of transistor trigger circuits of known construction.

Now it is a fact that there exis[illegible] variation among the characteristic[illegible]al transistors but that this variation [illegible] in a displacement upward or do[illegible] coordinates of Fig. 2, of the cha[illegible] whole. Thus, the upper curve o[illegible] sents the characteristic of one [illegible] lower curve represents the charac[illegible] other transistor, while the two [illegible] curves represent the characteris[illegible]ird transistor and of a fourth. It has [illegible] covered that the characteristic [illegible] transistor varies somewhat with te[illegible]d that this variation is of the same [illegible], if the characteristic of a partic[illegible]stor is as given by the upper curve of F[illegible]as the temperature is raised, the ch[illegible] is displaced downward in the coordi[illegible]g. 2. Indeed, the variations with tempera[illegible]ith transistor peculiarities is so great t[illegible]mitter voltage at the upper reflex point [illegible] characteristic may lie anywhere in the [illegible]-20 volts negative. In this respect, the c[illegible]g. 2 are not to scale.

It is explained in the A. J. Rack patent application above referred to that the operation of such a circuit depends on the intersection point of this N-shaped characteristic with a load line which in turn is the characteristic of the external resistor 8 in the emitter circuit. Such a load line is plotted in Fig. 2, where the slope of the line is proportional to the magnitude of the external emitter resistor 8, and its intercept on the zero current axis is proportional to the potential of the emitter bias source 5 which, in the case of the load line shown on Fig. 2, is small and negative.

In Fig. 2, the load line intersects each of the several transistor characteristics in a different point, and the differences among these intersections are representative of widely different performances. Thus, the intersection with the uppermost characteristic is on a positive resistance part of the characteristic so that operation with this transistor would be stable. However, it would be very close to instability so that a very small disturbance would cause the circuit to trip. The intersection with the lowermost characteristic is likewise on a positive resistance part and is, therefore, stable, but it represents an undesirable stability point because of the large emitter current which is drawn. The intersection with the second and third characteristics is in each case on the negative resistance portion of the curve and represents instability.

Evidently, if a circuit is constructed having specific values for the external resistors and bias sources, and the various transistors, whose characteristics are represented by the curves of Fig. 2, are connected in this circuit in turn, the first transistor may operate as a single trip multivibrator to the entire satisfaction of the user, while the second and third will oscillate, and the fourth may be objectionable on account of the large currents which its point of stable operation represents. It has thus been necessary in the past to choose the values of all the parameters of the external circuit to match the characteristic of the particular transistor employed and thereafter to maintain the temperature of the transistor fairly constant in order to avoid instability and to hold the operation to what is intended.

Figure 3:
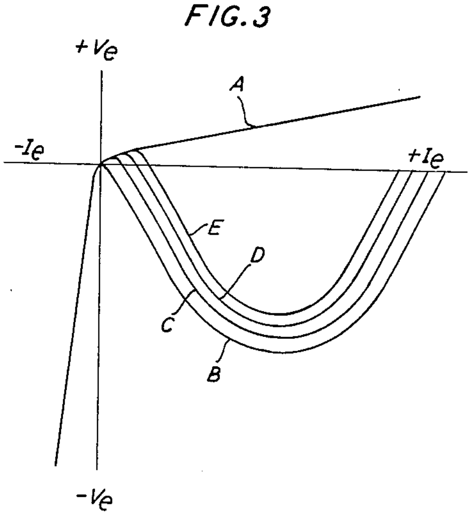
Fig. 3 is an explanatory diagram of assistance in the exposition of the invention.

Referring now to Fig. 3 curve A shows the current-voltage characteristic of a transistor having no external base resistance and in which the internal base resistance is negligibly small. It will be observed that this characteristic has no negative resistance part and therefore the transistor alone cannot serve as the basis for a trigger circuit. However, it is also true that individual transistors may differ widely from one to another in respect of the base currents which they draw, while still adhering very closely indeed to the characteristic of Fig. 3, which crosses the zero voltage axis almost exactly at the origin of coordinates. Evidently, if it were possible to follow the left-hand branch of the characteristic of Fig. 3 as far as the zero current axis and then, at a reflex point, depart from this curve in a downward direction along a negative resistance characteristic curve, the desired result would have been secured and the exact location of the upper reflex point would be largely independent of the particular transistor employed.

The present invention does just this. When the voltage and current applied to the emitter electrode are negative, the emitter is in its high resistance condition and substantially no current flows through it. Under these conditions the current flowing through the rectifier 9 is equal to the difference between the current from the bias battery 10 and the current which flows in the transistor base electrode 2 when its emitter current is zero. This current may be adjusted to zero by balancing one of these components against the other; e. g., by properly proportioning the magnitude of the bias battery 10 and the controlling resistor 11. Therefore, along the left-hand branch of the characteristic of Fig. 3 while the emitter current is less than zero, the rectifier 9 is in its forward or low resistance condition, there is substantially no regenerative feedback and operation follows a definite characteristic. As soon, however, as the applied emitter current and voltage have become positive by some small amount, which depends for its exact magnitude on the particular transistor employed, its base current, flowing upward, in the drawing, into the base electrode, becomes equal and opposite to the bias current in the rectifier 9. Then the rectifier 9 changes its condition to the condition of high resistance. Any further increase in the emitter current only tends further to increase the resistance of this rectifier so that the circuit is now one in which a high resistance is connected in series with the base electrode 2. By virtue of the current multiplication feature of the transistor, this makes for regenerative action and consequent instability, and a falling or negative resistance characteristic, shown, for example, by the curve B of Fig. 3.

As above stated, the exact tripping point depends on the particular transistor employed, in particular on its base current; and curves similar to curve B, but having slightly different tripping points are representative of the behavior of such other transistors in the new circuit. The differences among their individual tripping points lie in the range 0–1 milliampere, and 0–¼ volt. Obviously this compares very favorably with the wide differences among the tripping points obtainable without benefit of the invention, and illustrated in Fig. 2. At the same time, if a transistor whose behavior is represented by one of the curves C, D, E is employed, its tripping point may be made to coincide almost exactly with that of the curve B by adjustment of the rectifier bias current, for example by alteration of the resistance of the control resistor 11.

In operation, the fact that, over a small part of each cycle, the rectifier 9 is in its low resistance condition is of substantially no importance. The action of the rectifier is simply that, when in its high resistance condition, it furnishes the series base resistance for the transistor which makes for instability and the negative resistance characteristic, while when in its low resistance conditon it assures that the upper reflex point of the characteristic shall be to a very large extent independent of the particular transistor employed and of its temperature. Thus it is in effect a base-current-controlled switch, which switches a high external base resistance in and out of the circuit as required; and in so doing it switches the circuit from a condition of stability to a condition of instability and back again, as required.

Figure 4:
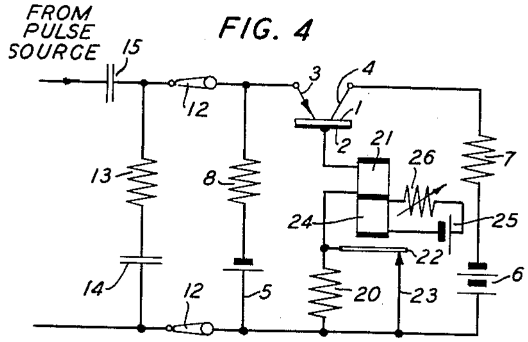
Fig. 4 is a schematic circuit diagram illustrating the principles of operation of the invention.

Fig. 4 is included to illustrate this action. Here the transistor, the bias potential source, the load line resistor and the associated resistor-condenser circuit are the same as in Fig. 1. The rectifier of Fig. 1 is replaced by an ordinary resistance element 20 of relatively high value, in series with the control winding 21 of a relay whose contacts 22, 23 are connected respectively to the two ends of the resistor 20. These contacts are arranged to be normally closed, and the relay may be adjusted to trip at a desired value of base current by means of a polarizing winding 24 through which flows the current of a bias battery 25 adjusted in magnitude by a variable resistor 26.

In operation, when the emitter current is zero or negative the base current is very small and its magnetizing effect is balanced by the current through the bias winding. Under this condition the resistor 20 is short-circuited. As soon, however, as the emitter goes positive, current begins to flow in the collector-to-base circuit of the transistor and this current overpowers the relay bias current. Thereupon the relay contacts 22, 23 are opened and the resistor 20 is switched into series connection with the base electrode 2. Regeneration then takes place as described above by reason of the high external base resistance 20 and the current multiplication factor of the transistor. When the circuit returns to its rest condition and the base current therefore falls to a value at which it is balanced by the bias current, the relay contacts 22, 23 close, and the resistor 20 is again short-circuited and so removed from the circuit, which is now once more stable.

Figure 5:
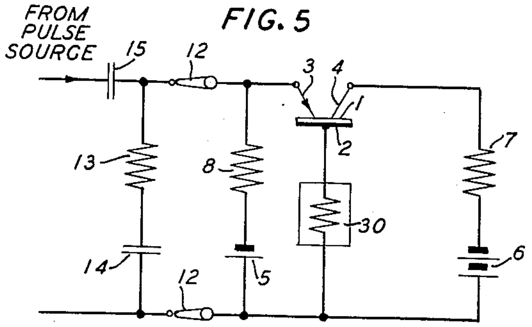
Fig. 5 is a schematic circuit diagram of a transistor trigger circuit alternative to that of Fig. 1.

Still other means for effectively switching a high resistance in and out of the base electrode lead are possible. Thus Fig. 5 shows a circuit which is the same as Fig. 1 except that the rectifier 9 is replaced by a thermistor 30 of large positive temperature coefficient. Thermistors having this characteristic are well known in the art. In operation, when the emitter current, and therefore the base current, are small the thermistor is of low resistance value and the circuit is stable. When the base current increases beyond this value the magnitude of the resistance of the thermistor increases rapidly and, again, a high resistance is effectively switched into series connection with the base electrode lead, thus making for instability of the circuit for emitter currents which are more positive than the tripping point current and for stability when the emitter current is more negative than the tripping point current. Still other modifications will occur to those skilled in the art.

What is claimed is:

1. An electrical trigger circuit which comprises a current-multiplication transistor having a semiconductive body and a base electrode, an emitter electrode and a collector electrode making contact with the body, a unidirectionally conducting element connected in series with the base electrode and poled for forward conduction in the opposite direction to that of normal transistor base current, and a source of operating potential interconnecting said unilaterally conducting element with said collector electrode, whereby said circuit is stable when the current through said element flows in the forward direction, and is unstable when the current through said element flows in the reverse direction.

2. An electrical trigger circuit which comprises a current-multiplication transistor having a semiconductive body and a base electrode, an emitter electrode and a collector electrode making contact with the body, a source of potential for supplying operating current to the collector electrode, a source of pulses connected to the emitter electrode, a controllable impedance element connected in series with the base electrode, and means including said impedance element, controlled by the current flowing in said base electrode, for opposing the flow of said current in one direction while permitting said current flow in the opposite direction.

3. An electrical trigger circuit which comprises a current-multiplication transistor having a semiconductive body and a base electrode, an emitter electrode and a collector electrode making contact with the body, said circuit having a ground point, means including a bias potential source interconnecting said collector electrode with said ground point for supplying operating current to said collector electrode, a first path including a resistor interconnecting said ground point with said emitter electrode, a second path interconnecting said ground point with said base electrode, a resistance element, and means for controllably switching said resistance element into and out of said second path.

4. Apparatus as defined in claim 3 wherein said last-named means is under control of the base electrode current of the transistor.

5. An electrical trigger circuit which comprises a current-multiplication transistor having a semiconductive body and a base electrode, an emitter electrode and a collector electrode making contact with the body, said circuit having a ground point, means including a bias potential source interconnecting said collector electrode with said ground point for supplying operating current to said collector electrode, a path including a resistor interconnecting said ground point with said emitter electrode, a resistance element of variable resistance value interconnecting said ground point with said base electrode, said element being responsive by an increase in its resistance to an increase in the normal base current of said transistor, whereby said element opposes changes in said base current.

6. Apparatus as defined in claim 5 wherein said element is a rectifier, poled for forward conduction in a direction opposite to that of the flow of normal transistor base current.

7. Apparatus as defined in claim 5 wherein said element is a temperature-sensitive resistance element having a positive temperature coefficient.

ALOIS J. RACK.

No references cited.